UNITED STATES PATENT OFFICE.

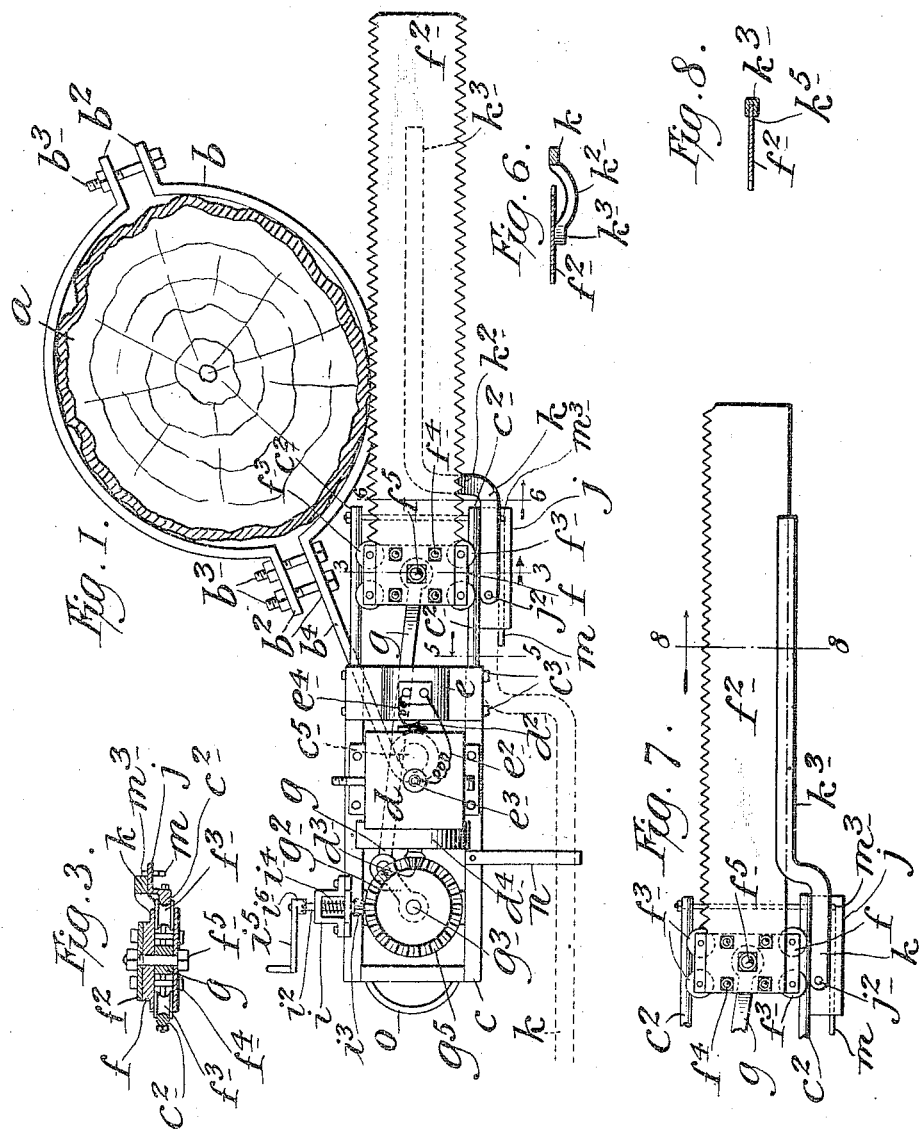

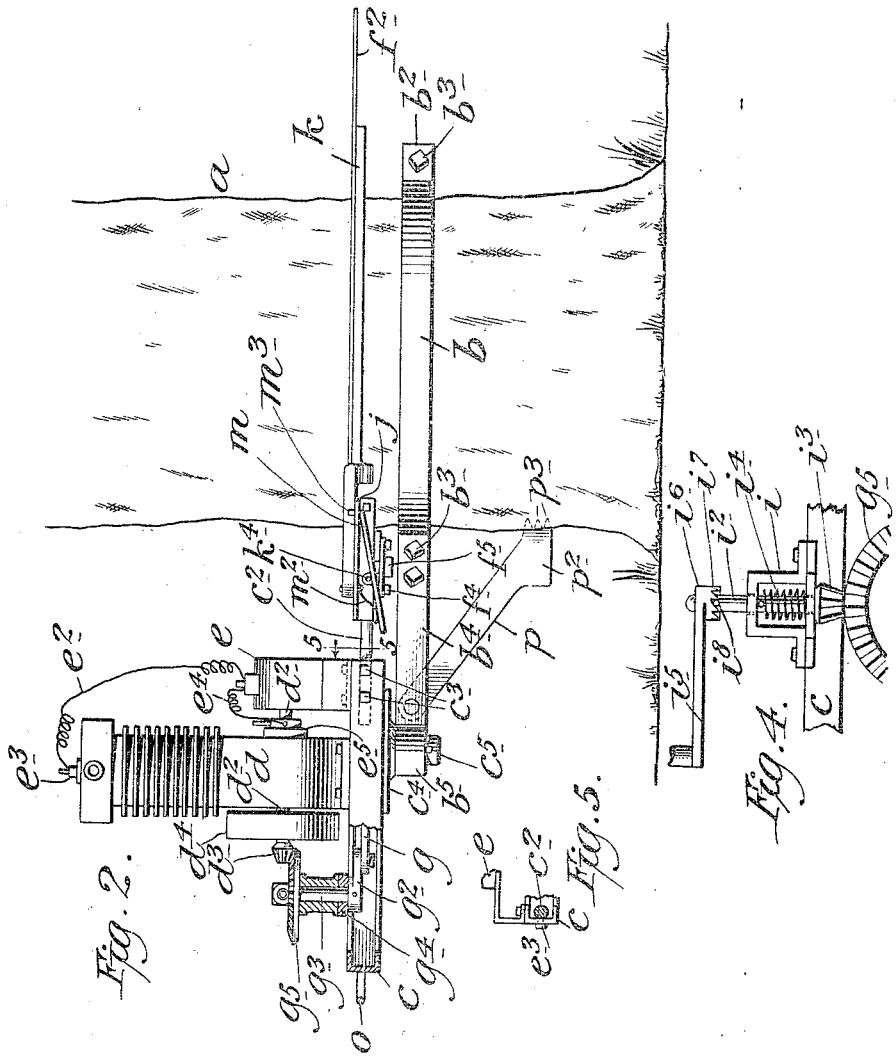

ETSON L. FREESE, OF NEW YORK, N. Y.

APPARATUS FOR FELLING TREES.

971,600.  Specification of Letters Patent.  Patented Oct. 4, 1910.

Application filed April 15, 1909. Serial No. 489,974.

*To all whom it may concern:*

Be it known that I, ETSON L. FREESE, a citizen of the United States, and residing at New York, in the county of New York and State of New York, have invented certain new and useful Improvements in Apparatus for Felling Trees, of which the following is a specification, such as will enable those skilled in the art to which it appertains to make and use the same.

This invention relates to means or apparatus for felling trees; and the object thereof is to provide an improved device or apparatus of this class which is particularly designed for felling trees of medium size, and which may be connected with the trunk of the tree and operate in such manner as to quickly fell the tree, or which may be mounted on a truck to be positioned adjacent to a tree; a further object being to provide an apparatus of the class specified which is simple in construction and operation and comparatively light whereby the transportation thereof from point to point and the use thereof are facilitated.

The invention is fully disclosed in the following specification, of which the accompanying drawings form a part, in which the separate parts of my improvement are designated by suitable reference characters in each of the views, and in which:—

Figure 1 is a plan view of my improved apparatus connected with the trunk of a tree in position for use, the trunk of the tree being shown in section, Fig. 2 a side view of the apparatus as shown in Fig. 1, Fig. 3 a section on the line 3—3 of Fig. 1, Fig. 4 a view similar to Fig. 1, but showing only a detail of the starting mechanism on an enlarged scale, Fig. 5 a section on the line 5—5 of Fig. 1, and 5—5 of Fig. 2, Fig. 6 a section on the line 6—6 of Fig. 1, Fig. 7 a view similar to Fig. 1, but showing only a part of the construction and showing a modification, and;—Fig. 8 a section on the line 8—8 of Fig. 7.

In the drawings forming part of this specification I have shown at $a$ the trunk of a tree, and in the practice of my invention as shown in the drawings I provide a clamp device $b$ adapted to be connected with the trunk of a tree, and which, in the form of construction shown, comprises two segmental members having projecting ears $b^2$ at their opposite end portions through which are passed bolts $b^3$, and by means of this construction the clamp, as will be understood, may be secured to trees the trunks of which are of different diameters or transverse dimensions. One of the clamp members is provided with a projecting arm $b^4$ which, in the form of construction shown, consists of an integral extension of one of the ear members $b^2$, and on this arm $b^4$, the operative parts of the apparatus are rotatably mounted. My invention however, is not limited to the particular form of clamp device shown, and any suitable device of this class having a projecting member on which the operative parts of the apparatus may be mounted may be substituted for that shown.

In the construction of the operative parts of the apparatus, I provide a yoke-shaped saw frame $c$ composed of channel iron, and in the side parts of the open end portion thereof are secured rods $c^2$, this connection being made, in the form of construction shown, by means of screws or bolts $c^3$ passed inwardly through the sides of the yoke-shaped frame and in the said side rods, as clearly shown in Fig. 5, and as thus constructed it will be seen that the side rods $c^2$ form a part of the yoke-shaped frame $c$ or a continuation thereof.

Secured to the bottom of the main part of the yoke-shaped frame $c$ is a cross plate $c^4$, the central bottom portion of which is provided with a trunnion $c^5$ which passes through and is rotatable in the head $b^5$ of the arm $b^4$, and with this construction the frame $c$ and all the operative parts of the apparatus mounted thereon, as hereinafter described, are free to rotate on the arm $b^4$.

Mounted on and approximately centrally of the frame $c$ is a gasolene motor $d$ provided with a power shaft $d^2$ having a beveled pinion $d^3$, and on which is also mounted a balance wheel $d^4$. Mounted on the inner end portion of the main part of the frame $c$ is a magneto $e$ with which is connected a wire $e^2$ which is connected with a sparking plug $e^3$ of the motor $d$, and the magneto $e$ is also provided with a wire $e^4$ which is connected with a regulator device $e^5$ of the motor $d$, these features of the construction including the motor $d$ and the magneto $e$ being of the usual or any preferred form.

Mounted between the rods $c^2$ which form an extension of the yoke-shaped frame $c$ is a cross head $f$ to which is secured a saw $f^2$, and the cross head $f$ is provided at its opposite sides with grooved rollers $f^3$ movable on the rods $c^2$. The cross head $f$, as shown in Fig. 3, consists of top and bottom plates connected by bolts $f^4$ and pivoted between said top and bottom plates as shown at $f^5$ is a crank rod $g$ which extends rearwardly through the frame $c$ to the outer end portion thereof, and is connected with a crank $g^2$ on the lower end of a crank pin $g^3$ which passes upwardly through a suitable support $g^4$ mounted on the yoke-shaped frame $c$ and the upper end of which is provided with a beveled gear wheel $g^5$ in connection with which the pinion $d^3$ on the shaft $d^2$ of the motor $d$ operates.

Mounted on and secured to one side of the yoke-shaped frame $c$ rearwardly of the motor $d$ is a housing $i$ in which is mounted a longitudinally movable shaft $i^2$ provided at its inner end with a beveled pinion $i^3$ adapted to engage the gear $g^5$, and within the housing $i$ is placed a spiral spring $i^4$ through which the shaft $i$ passes and which is adapted to force said shaft outwardly, and the outer end of the shaft $i$ is provided with a crank $i^5$ detachably connected therewith. This construction is clearly shown in Fig. 4, and the crank $i^5$ is provided with a head $i^6$ provided on its inner face with recesses forming teeth $i^7$ the walls of which are all beveled in the same direction, and the shaft $i^2$ is provided with a pin $i^8$ which operates in connection with said teeth and recesses.

The shaft $i^2$, the crank $i^5$ and the pinion $i^3$ constitute the starting mechanism of the motor, and in this operation the crank $i^5$ is connected with the shaft $i^2$ as shown. The shaft $i^2$ is then forced inwardly until the pinion $i^3$ engages the gear $g^5$, and in order to start the motor the crank $i^5$ is given a quick turn in the proper direction and this movement is transmitted to the shaft $d^2$ of the motor in the usual manner, and as the motor is thrown into operation the crank $i^5$ is detached from the shaft $i^2$ as will be readily understood, and at the end of this operation the spring $i^4$ forces the shaft $i^2$ outwardly until the pinion $i^3$ is disconnected from the gear $g^5$, and the shaft $i^2$ is not rotated by the motor when the latter is in operation.

The outer rods $c^2$ of the yoke-shaped frame $c$ is provided with a flange member $j$ which may be secured thereto or formed integrally therewith, and pivoted thereon as shown at $j^2$ is a guide arm $k$ provided with an angular extension $k^2$ which passes beneath and transversely of the saw $f^2$ to about the middle thereof, and said angular extension $k^2$ is downwardly curved as shown in Fig. 6 and provided with a supplemental guide arm $k^3$ which ranges forwardly and longitudinally of and beneath the central portion of the saw $f^2$. This arm or the supplemental part $k^3$ thereof forms a support for the saw in the operation of the machine and prevents unnecessary vibration thereof until the saw has entered the body of the tree sufficiently to prevent such vibration.

In the form of construction shown in Fig. 1, the saw $f^2$ is a double edged saw or provided at both of its edges with teeth, the object of this construction being to prevent to an extent the saw from binding in the body of the tree, but the binding of the saw in the body of the tree may also be prevented after the tree has been partially cut down by driving wedges into the cut formed by the saw, and the object of curving the angular extension $k^2$ of the arm $k$ downwardly is to permit the movement of the saw transversely thereof without affecting the teeth on the outer edge of the saw.

The flange member $j$, in the form of construction shown, is angular in cross section, and is connected with the adjacent rod $c^2$ as clearly shown in Fig. 3, and pivoted to the downwardly directed portion of said flange $j$, as shown at $k^4$ in Fig. 2, is an arm $m$ the rear end portion of which is normally depressed by a spring $m^2$, and the front end portion of which is provided with a pin or projection $m^3$ adapted to pass through a corresponding aperture in the flange $j$ and hold the arm $k$ in operative position as shown in Fig. 1, and the frame $c$ is also provided rearwardly of the motor $d$ with a suitable catch $n$ by which the arm $k$ may be held in an inoperative position as indicated in dotted lines in Fig. 1.

The various parts of the apparatus herein described are so formed and connected that when the crank $g^2$ ranges transversely of the frame $c$ or the cross head $f$ with which the saw $f^2$ is connected is midway of its movement, the machine is balanced on its support $b^5$, and this arrangement, as will be understood, prevents unnecessary vibration and jolting and jarring, and the machine is operated with the least possible friction.

The operation will be readily understood, in view of the foregoing description, when taken in connection with the accompanying drawings and the following statement thereof. In practice the clamp $b$ or other support is secured to the trunk of a tree, and the frame $c$ with the operative mechanism connected therewith is mounted on the end of the arm $b^4$. The apparatus is put in operation by turning the crank $i^5$, as will be readily understood, and the outer or free end of the frame $c$ is preferably provided with a handle $o$ by means of which said frame together with all the operative parts connected therewith and the saw $f^2$ may be swung horizontally so as to bring the teeth of the saw in contact with the tree, or out of contact with said tree as may be desired. The handle $o$ is also used during the operation of the apparatus to continually force the end of the frame $c$ adjacent to the tree inwardly so as to cause a continual pressure of the teeth of the saw on the trunk or body of the tree, and the apparatus is kept in operation until the trunk of the tree is cut through or substantially so, after which the apparatus is detached from the tree and the latter felled by a few strokes of an ax, or wedges may be driven into the cut formed by the saw for this purpose.

In Fig. 7 I have shown a modification in which the saw $f^2$ is provided with teeth only on one edge and the extension $k^2$ of the arm $k$ is provided with a groove $k^5$ in which the back edge of the saw fits, and with this construction the extension $k^2$ of the arm $k$ supports and forms a guide for the saw as will be readily understood.

My improved apparatus is simple in construction and operation and comparatively inexpensive, and various changes in and modifications of the construction herein described, may be made, within the scope of the appended claims, without departing from the spirit of my invention or sacrificing its advantages.

By mounting the saw frame as herein shown and described, it will be seen, that it may be turned through a complete revolution on its support if desired; and by reason of this fact the tree may be operated on from either side, and when a double edged saw is employed as shown in Fig. 1, this result may be accomplished without changing the saw or the position thereof in the cross head. This method of operation, as will be understood, renders my improved tree felling apparatus much more practical and efficient than would otherwise be the case, as the ability to operate on the tree from either side thereof has a great advantage as will be readily understood by those familiar with this class of apparatus. I also, in practice, pivot to the outer end of the arm $b^4$ of the support $b$ a brace $p$ provided at its lower end with a head $p^2$ and having teeth $p^3$, and in practice the teeth $p^3$ may be driven into the trunk of the tree as shown in Fig. 1, and this will serve to brace and support the arm $b^4$ and render the support of the saw frame more stable and secure.

Having fully described my invention, what I claim as new and desire to secure by Letters Patent, is:—

1. In an apparatus for felling trees, a support adapted to be connected with the trunk of a tree, a frame rotatably mounted on said support and balanced thereon and adapted to swing in a horizontal plane and provided at one end with parallel side members, a cross head movable between said side members, a saw connected with said cross head, a crank rod connected with said cross head, a crank pin mounted in the end of the frame opposite the cross head and provided with a crank with which said crank rod is connected, a gear connected with said crank pin, and a motor mounted on said frame and provided with a shaft in operative connection with said gear.

2. In an apparatus for felling trees, a support adapted to be connected with the trunk of a tree, a frame rotatably mounted on said support and balanced thereon and adapted to swing in a horizontal plane and provided at one end with parallel side members, a cross head movable between said side members, a saw connected with said cross head, a crank rod connected with said cross head, a crank pin mounted in the end of the frame opposite the cross head and provided with a crank with which said crank rod is connected, a gear connected with said crank pin, a motor mounted on said frame and provided with a shaft in operative connection with said gear, and a shaft mounted transversely of said gear and provided at one end with a pinion meshing with said gear.

3. In an apparatus for felling trees, a support adapted to be connected with the trunk of a tree, a frame rotatably mounted on said support and balanced thereon and adapted to swing in a horizontal plane and provided at one end with parallel side members, a cross head movable between said side members, a saw connected with said cross head, a crank rod connected with said cross head, a crank pin mounted in the end of the frame opposite the cross head and provided with a crank with which said crank rod is connected, a gear wheel connected with said crank pin, a motor mounted on said frame and provided with a shaft in operative connection with said gear, and a transversely movable starting shaft mounted at the side of said gear and provided with a pinion adapted to engage the same, said starting shaft being provided with a detachable crank.

4. In an apparatus for felling trees, a support adapted to be connected with the trunk of a tree, a frame rotatably mounted on said support and balanced thereon and adapted to swing in a horizontal plane and provided at one end with parallel side members, a cross head movable between said side members, a saw connected with said cross head, a crank rod connected with said cross head, a crank pin mounted in the end of the frame opposite the cross head and provided with a crank with which said crank rod is connected, a gear wheel connected with said crank pin, a motor mounted on said frame and provided with a shaft in operative connection with said gear, and a transversely movable starting shaft mounted at the side of said gear and provided with a pinion adapted to engage the same, said starting shaft being provided with a detachable crank, and said cross head being provided with a pivoted arm adapted to serve as a support and guide for the saw.

5. In an apparatus of the class described, a support adapted to be connected with the trunk of a tree, a saw frame mounted thereon and provided with a motor, a cross head movable in said frame, devices in operative connection with said motor and said cross head for operating said cross head, a saw connected with said cross head, and an arm pivoted to said frame and adapted to be swung into position to serve as a guide and support for the same.

6. In an apparatus of the class described, a support adapted to be connected with the trunk of a tree, a saw frame mounted thereon and provided with a motor, a cross head movable in said frame, devices in operative connection with said motor and said cross head for operating said cross head, a saw connected with said cross head, and an arm pivoted to said frame and adapted to be swung into position beneath and longitudinally of the saw and to serve as a guide and support for the same, said saw being provided with teeth at both edges.

7. In an apparatus for felling trees, a support adapted to be connected with the trunk of a tree, a saw frame rotatably mounted on said support and balanced thereon and adapted to be turned in a horizontal plane and provided at one end with parallel side members, a cross head movable between said side members, a saw connected with said cross head and provided at each edge with teeth, and a motor mounted on said frame and geared in connection with said cross head whereby the saw can be made to operate on opposite sides of a tree without moving the support.

In testimony that I claim the foregoing as my invention I have signed my name in presence of the subscribing witnesses this 13th day of April 1909.

ETSON L. FREESE.

Witnesses:
  H. R. CANFIELD,
  C. E. MULREANY.